(12) United States Patent
Ohki

(10) Patent No.: US 9,181,599 B2
(45) Date of Patent: Nov. 10, 2015

(54) METHOD FOR HEAT-TREATING RING-SHAPED MEMBER AND METHOD FOR PRODUCING RING-SHAPED MEMBER

(71) Applicant: Chikara Ohki, Kuwana (JP)

(72) Inventor: Chikara Ohki, Kuwana (JP)

(73) Assignee: NTN CORPORATION, Osaka (JP)

( * ) Notice: Subject to any disclaimer, the term of this patent is extended or adjusted under 35 U.S.C. 154(b) by 8 days.

(21) Appl. No.: 14/354,816

(22) PCT Filed: Oct. 16, 2012

(86) PCT No.: PCT/JP2012/076672
§ 371 (c)(1),
(2) Date: Apr. 28, 2014

(87) PCT Pub. No.: WO2013/061822
PCT Pub. Date: May 2, 2013

(65) Prior Publication Data
US 2014/0305552 A1     Oct. 16, 2014

(30) Foreign Application Priority Data
Oct. 28, 2011   (JP) ................. 2011-237495

(51) Int. Cl.
*C21D 9/40* (2006.01)
*C21D 1/42* (2006.01)
(Continued)

(52) U.S. Cl.
CPC .. *C21D 9/40* (2013.01); *C21D 1/10* (2013.01); *C21D 1/42* (2013.01); *C22C 38/00* (2013.01); *C22C 38/02* (2013.01); *C22C 38/04* (2013.01); *C22C 38/22* (2013.01); *C22C 38/44* (2013.01);
(Continued)

(58) Field of Classification Search
CPC .............. C21D 9/40; C21D 1/10; C21D 1/42; C22C 38/00; C22C 38/22; C22C 38/04
See application file for complete search history.

(56) References Cited

U.S. PATENT DOCUMENTS

2012/0121420 A1   5/2012  Yuki et al.

FOREIGN PATENT DOCUMENTS

| EP | 2458023 A1 | 5/2012 |
| JP | 59-118812 A | 7/1984 |

(Continued)

OTHER PUBLICATIONS

International Search Report issued in Application No. PCT/JP2012/076672 dated Nov. 20, 2012.

(Continued)

*Primary Examiner* — Rebecca Lee
(74) *Attorney, Agent, or Firm* — McDermott Will & Emery LLP

(57) ABSTRACT

A method for heat-treating a ring-shaped member includes the steps of: forming, by relatively rotating a coil along the circumferential direction of the formed body, an annular heated region in the formed body, the heated region having the steel austenitized therein; and simultaneously cooling a whole of the heated region to a temperature of not more than an $M_s$ point. In the step of forming the heated region, the heating is performed to repeatedly change over for a plurality of times between a state in which each region of the rolling contact surface has a temperature exceeding a temperature of an $A_1$ point and a state in which each region of the rolling contact surface has a temperature that is less than the temperature of the $A_1$ point and that maintains a supercooled austenite state.

10 Claims, 6 Drawing Sheets

(51) Int. Cl.
*C21D 1/10* (2006.01)
*C22C 38/00* (2006.01)
*C22C 38/22* (2006.01)
*C22C 38/44* (2006.01)
*F16C 33/64* (2006.01)
*C22C 38/02* (2006.01)
*C22C 38/04* (2006.01)

(52) U.S. Cl.
CPC ............. *F16C 33/64* (2013.01); *F16C 2204/64* (2013.01); *F16C 2360/31* (2013.01)

(56) References Cited

FOREIGN PATENT DOCUMENTS

| | | |
|---|---|---|
| JP | 2005-325409 A | 11/2005 |
| JP | 2006-179359 A | 7/2006 |
| JP | 2011-26633 A | 2/2011 |
| WO | 2011010664 A1 | 1/2011 |

OTHER PUBLICATIONS

Office Action Chinese Patent Application No. 201280052764.4 dated Apr. 3, 2015 with full English translation.

METHOD FOR HEAT-TREATING RING-SHAPED MEMBER AND METHOD FOR PRODUCING RING-SHAPED MEMBER

CROSS-REFERENCE TO RELATED APPLICATIONS

The present application is the U.S. National Phase of PCT/JP2012/076672 dated Oct. 16, 2012 which claims priority from Japanese Patent Application No. 2011-237495 filed Oct. 28, 2011 the subject matter of each is incorporated herein by reference in entirety.

TECHNICAL FIELD

The present invention relates to a method for heat-treating a ring-shaped member and a method for producing a ring-shaped member, more particularly, a method for heat-treating a ring-shaped member and a method for producing a ring-shaped member, by each of which production cost for a quenching apparatus can be suppressed.

BACKGROUND ART

High-frequency quenching may be employed as quench hardening on a ring-shaped member of steel such as a bearing ring of a rolling bearing. This high-frequency quenching has such advantages that equipment can be simplified and heat treatment in a short time is enabled, as compared with general quench hardening of heating the ring-shaped member in a furnace and thereafter dipping the same in a cooling liquid such as oil.

In order to simultaneously heat an annular region, to be quench-hardened along the circumferential direction of the ring-shaped member in the high-frequency quenching, however, an induction heating member such as a coil for induction-heating the ring-shaped member must be arranged to face this region (for example, see Japanese Patent Laying-Open No. 59-118812 (Patent Document 1)). In a case of quench-hardening a large-sized ring-shaped member, therefore, there are such problems that a large-sized coil therefore and a large-capacity power source for this coil are required and the production cost for a quenching apparatus increases.

As a method to avoid such a problem, the following method has been proposed. That is, a coil is arranged to thee part of a circumferential surface of a ring-shaped member and is relatively rotated along the circumferential direction of the ring-shaped member so as to form an annular heated region heated to a temperature of not less than an $A_1$ point, and then the whole of the heated region is simultaneously cooled to a temperature of not more than $M_s$ (for example, see Japanese Patent Laying-Open No. 2011-26633 (Patent Document 2)).

CITATION LIST

Patent Document

PTD 1: Japanese Patent Laying-Open No. 59-118812
PTD 2: Japanese Patent Laying-Open No. 2011-26633

SUMMARY OF INVENTION

Technical Problem

However, when the steel of the ring-shaped member is heated to result in an austenitized surface, the steel is changed from a ferromagnetic material to a paramagnetic material, thus resulting in decrease of heat generation density in the induction heating. Accordingly, it takes a long time to form an annular heated region having a desired thickness and heated to not less than the $A_1$ point. Hence, when the aforementioned heat-treating method of Patent Document 2 is employed and the size of the annular member is large, a countermeasure needs to be taken, such as use of more coils, use of a coil elongated in the circumferential direction, or increased output of power supply. This results in increase of the production cost for a quenching apparatus, disadvantageously.

The present invention has been made to solve the aforementioned problem, and has an object to provide a method for beat-treating a ring-shaped member and a method for producing a ring-shaped member, by each of which production cost for a quenching apparatus can be suppressed.

Solution to Problem

A method for heat-treating a ring-shaped member in the present invention includes the steps of forming, by relatively rotating an induction heating member arranged to face part of a circumferential surface of a ring-shaped member made of steel for induction-heating the ring-shaped member along the circumferential direction of the ring-shaped member, an annular heated region in the ring-shaped member, the heated region having the steel austenitized therein; and simultaneously cooling a whole of the heated region to a temperature of not more than an $M_s$ point. In the step of forming the heated region, the heating is performed to repeatedly change over for a plurality of times between a state in which each region of the circumferential surface has a temperature exceeding a temperature of an $A_1$ point and a state in which each region of the circumferential surface has a temperature that is less than the temperature of the $A_1$ point and that maintains a supercooled austenite state.

In the method for heat-treating the ring-shaped member according to the present invention, the induction heating member arranged to face part of the ring-shaped member relatively rotates along the circumferential direction, whereby the heated region is formed on the ring-shaped member. On this occasion, the whole of the heated region is not heated to have a temperature exceeding the temperature of the $A_1$ point, but the heating is performed to sequentially and repeatedly change over in the circumferential direction between the state in which each region of the circumferential surface has a temperature exceeding the temperature of the $A_1$ point and the state in which each region of the circumferential surface has a temperature that is less than the temperature of the $A_1$ point and that maintains the supercooled austenite state. More specifically, the region of the circumferential surface that faces the induction heating member is heated to the temperature exceeding the temperature of the $A_1$ point. By relatively moving the induction heating member in the circumferential direction of the ring-shaped member, the heated region is moved away from the location facing the induction heating member. Accordingly, the temperature thereof is decreased. Here, even though the temperature of the region is decreased to be less than the temperature of the $A_1$ point, the supercooled austenite state can be maintained as long as the temperature falls below a prescribed temperature determined by its material. When the region is brought to face the induction heating member again with the supercooled austenite state being maintained, the temperature thereof is increased again to exceed the temperature of the $A_1$ point. By repeating this, time is accumulated during which it is held in such a state that the temperature exceeds the temperature of the $A_1$ point while maintaining the steel in the austenite state. After the dissolved state of carbon in the base material becomes suitable for quenching, the whole of the heated region is simultaneously cooled to the temperature of not more than the $M_s$ point and is quench-hardened.

Because the quenching treatment is implemented by such a process, the whole of the heated region can be simultaneously quench-hardened even when the induction heating member does not have a capability of providing the whole of the heated region with a temperature exceeding the temperature of the $A_1$ point. Accordingly, even when quench-hardening, for example, a large-sized ring-shaped member, a large-sized coil or a large-capacity power source for such a coil does not need to be prepared to simultaneously enable the whole of the heated region to have a temperature exceeding the temperature of the $A_1$ point. Accordingly, production cost for a quenching apparatus can be suppressed.

In the method for heat-treating the ring-shaped member, a plurality of the induction heating members may be arranged along the circumferential direction of the ring-shaped member in the step of forming the heated region. In this way, in the step of forming the heated region, the supercooled austenite state can be maintained readily.

In the method for heat-treating the ring-shaped member the steel of the ring-shaped member may contain not less than 0.43 mass % and not more than 0.65 mass % of carbon, not less than 0.15 mass % and not more than 0.35 mass % of silicon, not less than 0.60 mass % and not more than 1.10 mass % of manganese, not less than 0.30 mass % and not more than 1.20 mass % of chromium and not less than 0.15 mass % and not more than 0.75 mass % of molybdenum with the rest consisting of iron and an impurity.

Alternatively, in the method for heat-treating the ring-shaped member, the steel of the ring-shaped member may contain not less than 0.43 mass % and not more than 0.65 mass % of carbon, not less than 0.15 mass % and not more than 0.35 mass % of silicon, not less than 0.60 mass % and not more than 1.10 mass % of manganese, not less than 0.30 mass % and not more than 1.20 mass % of chromium, not less than 0.15 mass % and not more than 0.75 mass % of molybdenum and not less than 0.35 mass % and not more than 0.75 mass % of nickel with the rest consisting of iron and an impurity.

By thus employing the steel having an appropriate component composition, the heat-treating method of the present invention provides a ring-shaped member, such as a bearing ring of a rolling bearing, having a high hardness and excellent durability.

Now, the following describes a reason why the component range of the steel is limited to the aforementioned range.

Carbon: not less than 0.43 mass % and not more than 0.65 mass %

The carbon content exerts a remarkable influence on the hardness of the steel after the quench hardening. If the carbon content in the steel constituting the ring-shaped member is less than 0.43 mass %, it becomes difficult to secure sufficient hardness after the quench hardening. If the carbon content exceeds 0.65 mass %, on the other hand, occurrence of cracking (quench cracking) at the time of the quench hardening is apprehended. Therefore, the carbon content is preferably set to not less than 0.43 mass % and not more than 0.65 mass %.

Silicon: not less than 0.15 mass % and not more than 0.35 mass %

Silicon contributes to improvement in temper softening resistance of the steel. If the silicon content in the steel constituting the ring-shaped member is less than 0.15 mass %, the temper softening resistance becomes insufficient, and there is a possibility that the hardness remarkably lowers due to tempering after the quench hardening or temperature rise during use of the ring-shaped member. If the silicon content exceeds 0.35 mass %, on the other hand, the hardness of the material before the quenching increases, and workability in cold working at the time of forming the material thereinto lowers. Therefore, the silicon content is preferably set to not less than 0.15 mass % and not more than 0.35 mass %.

Manganese: not less than 0.60 mass % and not more than 1.10 mass %

Manganese contributes to improvement in quenchability of the steel. If the manganese content is less than 0.60 mass %, this effect is not sufficiently attained. If the manganese content exceeds 1.10 mass %, on the other hand, hardness of the material before the quenching increases, and the workability in the cold working lowers. Therefore, the manganese content is preferably set to not less than 0.60 mass % and not more than 1.10 mass %.

Chromium: not less than 0.30 mass % and not more than 1.20 mass %

Chromium contributes to improvement in quenchability of the steel. If the chromium content is less than 0.30 mass %, this effect is not sufficiently attained. If the chromium content exceeds 1.20 mass % on the other hand, there arises such a problem that the material cost rises. Therefore, the chromium content is preferably set to not less than 0.30 mass % and not more than 1.20 mass %.

Molybdenum: not less than 0.15 mass % and not more than 0.75 mass %

Molybdenum also contributes to improvement in quenchability of the steel. If the molybdenum content is less than 0.15 mass %, this effect is not Sufficiently attained. If the molybdenum content exceeds 0.75 mass %, on the other hand, there arises such a problem that the material cost rises. Therefore, the molybdenum content is preferably set to not less than 0.15 mass % and not more than 0.75 mass %.

Nickel: not less than 0.35 mass % and not more than 0.75 mass %

Nickel also contributes to improvement in quenchability of the steel Nickel can be added in a case where particularly high quenchability is required for the steel constituting the ring-shaped member such as a case where the outer diameter of the ring-shaped member is large. If the nickel content is less than 0.35 mass %, the effect of improving the quenchability is not sufficiently attained. If the nickel content exceeds 0.75 mass %, on the other hand, there is a possibility that the quantity of residual austenite after the quenching increases to cause reduction of the hardness, reduction of dimensional stability and the like. Therefore, nickel is preferably added thereto in the range of not less than 0.35 mass % and not more than 0.75 mass % as required.

In the method for heat-treating the ring-shaped member, in the step of forming the heated region, each region of the circumferential surface may he retained, for an accumulated time of not less than 1 minute, in the state in which each region of the circumferential surface has the temperature exceeding the temperature of the $A_1$ point, and then the step of cooling the whole of the heated region may be performed. In this way, the quenching treatment can be performed more securely with the carbon of the steel being appropriately dissolved in the base material.

In the method for heat-treating the ring-shaped member, in the step of forming the heated region, the heated region may be formed such that the circumferential surface does not have a temperature exceeding 1000° C. This leads to suppression of decreased property resulting from coarse crystal grains in the steel.

In the method for heat-treating the ring-shaped member, the ring-shaped member may have an inner diameter of not less than 1000 mm. According to the method. for heat-treating the ring-shaped member in the present invention, the production cost for a quenching apparatus can be suppressed even in a case of quench-hardening such a large-sized ring-shaped member.

A method for producing a ring-shaped member in the present invention includes the steps of: preparing a ring-shaped formed body made of steel; and quench-hardening the formed body. The formed body is quench-hardened with the aforementioned method for heat-treating the ring-Shaped member in the present invention, in the step of quench-hardening the formed body. In the method for producing the ring-shaped member in the present invention, the production cost for quenching equipment can be suppressed by quench-hardening the formed body using the method for heat-treating the ring-shaped member in the present invention.

In the method for producing the ring-shaped member, the ring-shaped member may ne a bearing ring of a bearing. The aforementioned method for producing the ring-shaped member, which allows for uniform quench-hardening along the entire circumference of the circumferential surface, is suitable for production of a bearing ring of a bearing.

In the method for producing the ring-shaped member, the bearing ring may be used for a rolling bearing that supports a main shaft connected to a blade in a wind turbine generator. The method for producing the ring-shaped member in the present invention, which allows for production of a large-sized ring-shaped member, is suitable for production of a bearing ring of a rolling bearing having a large diameter and used for wind power generation.

The $A_1$ point denotes a point corresponding to a temperature at which the structure of steel starts transformation from ferrite to austenite in a case of heating the steel. The $M_s$ point denotes a point corresponding to a temperature at which austenized steel starts martensitation when cooled.

Advantageous Effects of Invention

As apparent from the description above, according to the method for heat-treating the ring-shaped member and the method for producing the ring-shaped member in the present invention, there can be provided a method for heat-treating a ring-shaped member and a method for producing a ring-shaped member, by each of which production cost for a quenching apparatus can be suppressed.

DESCRIPTION OF EMBODIMENTS

Figure 1:
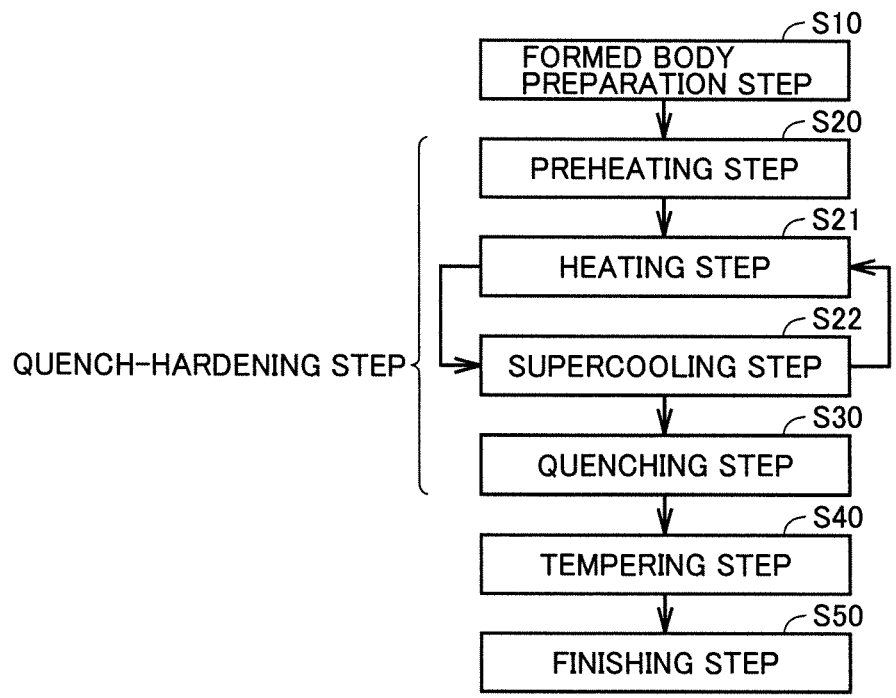
FIG. 1 is a flowchart showing an outline of a method for producing an inner ring of a rolling bearing.

The following describes embodiments of the present invention with reference to figures. It should be noted that in the below-mentioned figures, the same or corresponding portions are given the same reference characters and are not described repeatedly.

(First Embodiment)

First, a first embodiment which is an embodiment of the present invention is described with reference to a method for producing a bearing ring (inner ring) of a rolling bearing which is a ring-shaped member. Referring to FIG. 1, a formed body preparation step is first performed as a step (S10) in the method for producing an inner ring according to the present embodiment. In this step (S10), a steel product of JIS SUP13. for example, is prepared, and working such as forging or turning is executed, whereby a ring-shaped formed body having a shape corresponding to a desired shape of an inner ring is prepared.

Figure 2:
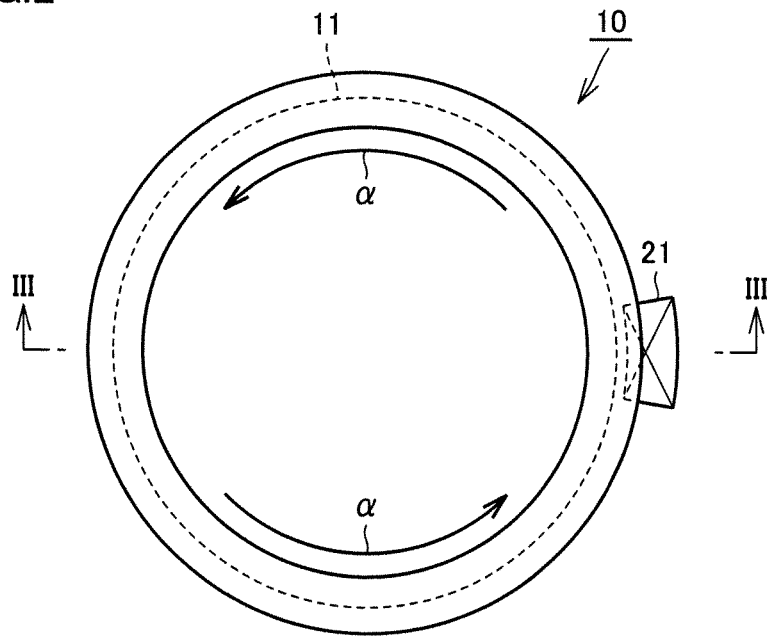
FIG. 2 is a schematic diagram for illustrating a quench hardening step.
Figure 3:
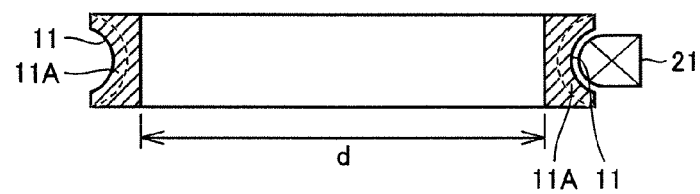
FIG. 3 is a schematic sectional view showing a cross section taken along a line segment III-III in FIG. 2.

Then, referring to FIG. 1, a quench hardening step is performed. This quench hardening step includes: a preheating step performed as a step (S20); a heating step performed as a step (S21); a supercooling step performed as a step (S22); and a quenching step performed as a step (S30). In the step (S20), referring to FIGS. 2 and 3 first, a coil 21 as an induction heating member is arranged to face part of a rolling contact surface 11 which is a surface where a rolling element must roll in formed body 10 prepared in the step (S10). A surface of coil 21 facing rolling contact surface 11 has a shape along rolling contact surface 11, as shown in FIG. 3. Then, formed body 10 is rotated on a central axis, more specifically in a direction of arrow α, while a high-frequency current is supplied to coil 21 from a power source (not shown). In this way, a surface layer region of formed body 10 including rolling contact surface 11 is heated.

When rolling contact surface 11 is heated to a temperature of not less than a $A_1$ point in the step (S20), the steel is changed from a ferromagnetic material to a paramagnetic material, thus resulting in decrease of heat generation density in the induction heating. To address this, the step (S20) is ended when or before rolling contact surface 11 has been heated to the temperature of not less than the $A_1$ point, and then the step (S21) is started.

In the step (S21), the heating is performed until a location facing coil 21 and corresponding to a desired hardening depth, such as a location facing coil 21 and disposed at a depth of 7 mm from rolling contact surface 11, has a temperature exceeding the temperature of the $A_1$ point. Specifically, for example, by rotating formed body 10 at a speed slower than that in the step (S20), each region of rolling contact surface 11 faces coil 21 for a longer time during one rotation. In this way, a larger amount of heat is applied to the surface layer portion including rolling contact surface 11 whenever it passes through the region facing coil 21, thereby heating to such an extent that, for example, the temperature in the location at a depth of 7 mm from rolling contact surface 11 exceeds the temperature of the $A_1$ point. In other words, in the step (S21), the rotational speed of formed body 10 is made lower than that in the step (S20) In this way, the region of rolling contact surface 11 facing coil 21 and the surface layer portion just therebelow (for example, region up to a depth of 7 mm) are heated to have a temperature exceeding the temperature of the $A_1$ point.

Next, in the step (S22), formed body 10 continues to be rotated, whereby the region or rolling contact surface 11 heated in the step (S21) is moved away from the location facing coil 21. Accordingly, the temperature of the region is decreased. In the step (S22), rolling contact surface 11 heated in the step (S21) and the surface layer portion just therebelow are cooled to a temperature of less than the temperature of the $A_1$ point, but are brought to the region racing coil 21 again with its supercooled austenite state being maintained. In this way, the step (S22) is ended and the step (S21) is performed again. In other words, by rotating formed body 10 for a plurality of times at a speed less than that in the step (S20) after completion of the step (S20), the steps (S21) and (S22) are performed repeatedly for a plurality of times. In this way, time is accumulated during which it is retained at a temperature exceeding the temperature of the $A_1$ point while maintaining the steel in the austenite state. Then, when an annular heated region 11A having the steel austenitized therein is formed in the region of formed body 10 including rolling contact surface 11 and the dissolved state of carbon in the base material becomes suitable for quenching the repetition of the steps (S21) and (S22) is ended and the step (S30) is then performed.

In the step (S30), water as a cooling liquid, for example, is injected toward the whole of formed body 10 including heated region 11A formed in the steps (S20) to (S22), whereby the whole of heated region 11A is simultaneously cooled to a temperature of not more than an $M_s$ point. Thus, heated region 11A transforms into martensite, and hardens. Through the aforementioned procedure, high-frequency quenching is executed, and the quench hardening step is completed.

Then, a tempering step is performed as a step (S40) in this step (S40), formed body 10 quench-hardened in the steps (S20) to (S30) is charged into a furnace, for example, heated to a temperature of not more than the $A_1$ point and retained for a prescribed time, whereby tempering is executed.

Then, a finishing step is performed as a step (S50), in this step (S50), finishing such as polishing is executed on rolling contact surface 11, for example. Through the aforementioned process, the inner ring of the rolling bearing is completed, and production of the inner ring according to the present embodiment is completed.

In the present embodiment, the quenching treatment is implemented by the process of the aforementioned steps (S20) to (S30), thereby simultaneously quench-hardening the whole of heated region 11A even when quenching equipment does not have a capability of simultaneously providing the whole of heated region 11A with a temperature exceeding the temperature of the $A_1$ point by coil 21. Accordingly, even when quench-hardening a large-sized formed body 10, a large-sized coil or a large-capacity power source for such a coil does not need to be prepared to simultaneously provide the whole of heated region 11A with a temperature exceeding the temperature of the $A_1$ point. Accordingly, the production cost for a quenching apparatus can he suppressed.

Figure 4:
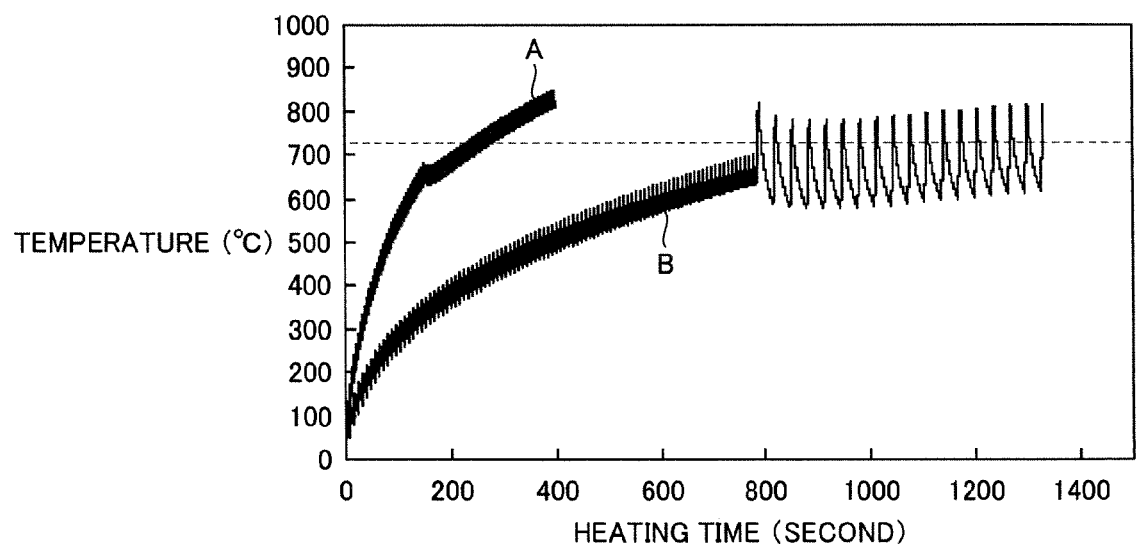
FIG. 4 shows a temperature history in a prescribed site at a depth of 7 mm from a rolling contact surface.
Figure 5:
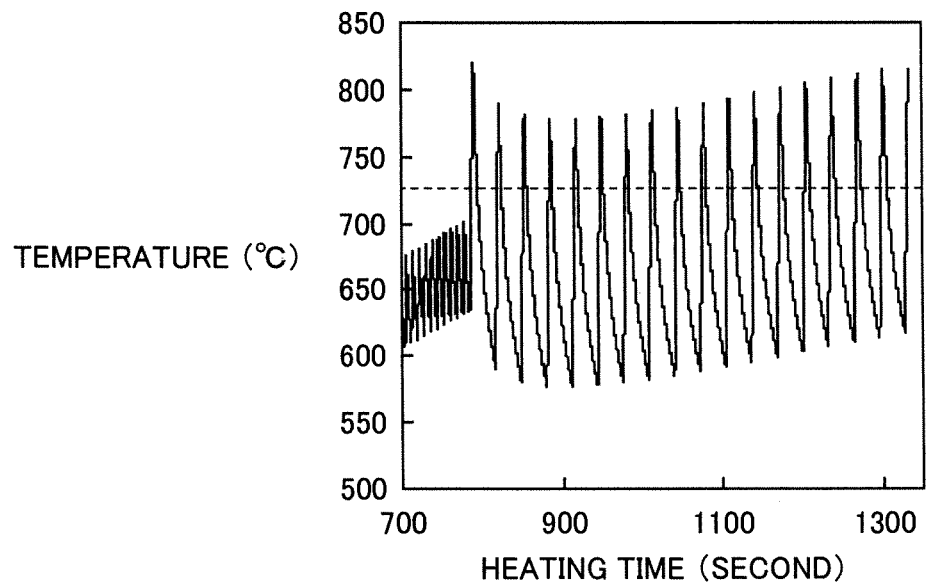
FIG. 5 shows a main part of the temperature history in an enlarged manner.
Figure 6:
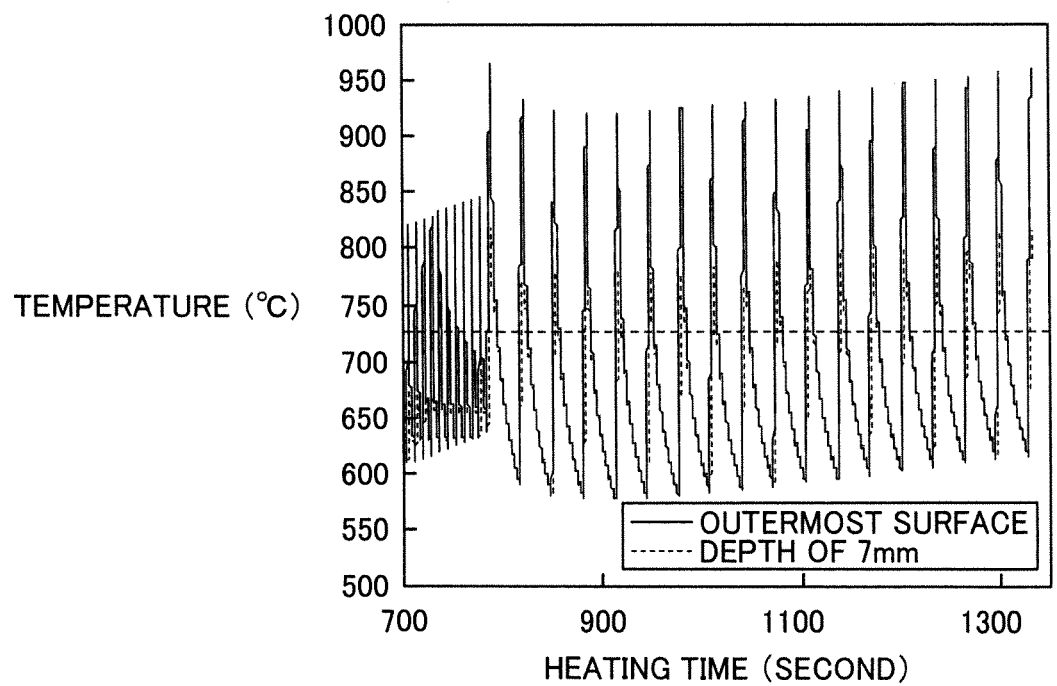
FIG. 6 shows a temperature history in each of the rolling contact surface and the location at a depth of 7 mm from the rolling contact surface.

Here, the following describes the steps (S20) to (S30) more in detail with reference to data obtained when there was prepared a ring-shaped member made of JIS SUP13 and having an inner diameter d (see FIG. 3) of more than 1000 mm and the process in the above-described embodiment was actually performed. FIG. 4 shows results of measuring a temperature history in a point at a depth of 7 mm from rolling contact surface 11. A curve A represents a case where eight coils are arranged side by side along the circumferential direction of rolling contact surface 11. A curve B represents a case where four coils are arranged side by side. FIG. 5 is an enlarged view of a region corresponding to the steps (S21) and (S22) in curve B. FIG. 6 shows a curve representing the temperature history in the outermost surface (i.e., rolling contact surface 11) in such a manner that the curve overlaps with FIG. 5. In each of FIG. 4 to FIG. 6, a broken line represents the temperature of the $A_1$ point.

Referring to FIG. 4, in the ease where the eight coils are arranged side by side along the circumferential direction of rolling contact surface 11, the temperature in the measurement location has exceeded the temperature of the $A_1$ point after passage of approximately 250 seconds from the start of heating. Hence, when there is quenching equipment corresponding to curve A, the quench-hardening treatment can he performed by heating the whole of heated region 11A to the temperature exceeding the temperature of the $A_1$ point in accordance with the method disclosed in Patent Document 2, for example. Meanwhile, in the case where the four coils are arranged side by side along the circumferential direction of rolling contact surface 11, the temperature in the measurement location has not reached the temperature of the $A_1$ point under the same condition even after passage of approximately 800 seconds from the start of heating. Hence, it is difficult to employ the method of Patent Document 2 in which the whole of heated region 11A is heated to the temperature exceeding the temperature of the $A_1$ point.

To address this, as shown in FIG. 4 and FIG. 5, by decreasing the rotational speed of formed body 10 when the temperature has come close to the temperature of the $A_1$ point, the step (S20) can be ended and The process can be brought to the steps (S21) and (S22). In these steps (S21) and (S22), as shown in FIG. 4 and FIG. 5, heating is performed to repeatedly change over for a plurality of times between the state in which the measurement location has a temperature exceeding the temperature of the $A_1$ point and the state in which the measurement location has a temperature that is less than the temperature of the $A_1$ point and that maintains the supercooled austenite state. On this occasion, as shown in FIG. 6, the step (S21) is preferably performed such that the temperature in the outermost surface does not exceed 1000° C. This leads to suppression of decreased durability resulting from coarse crystal grains in rolling contact surface 11.

Figure 7:
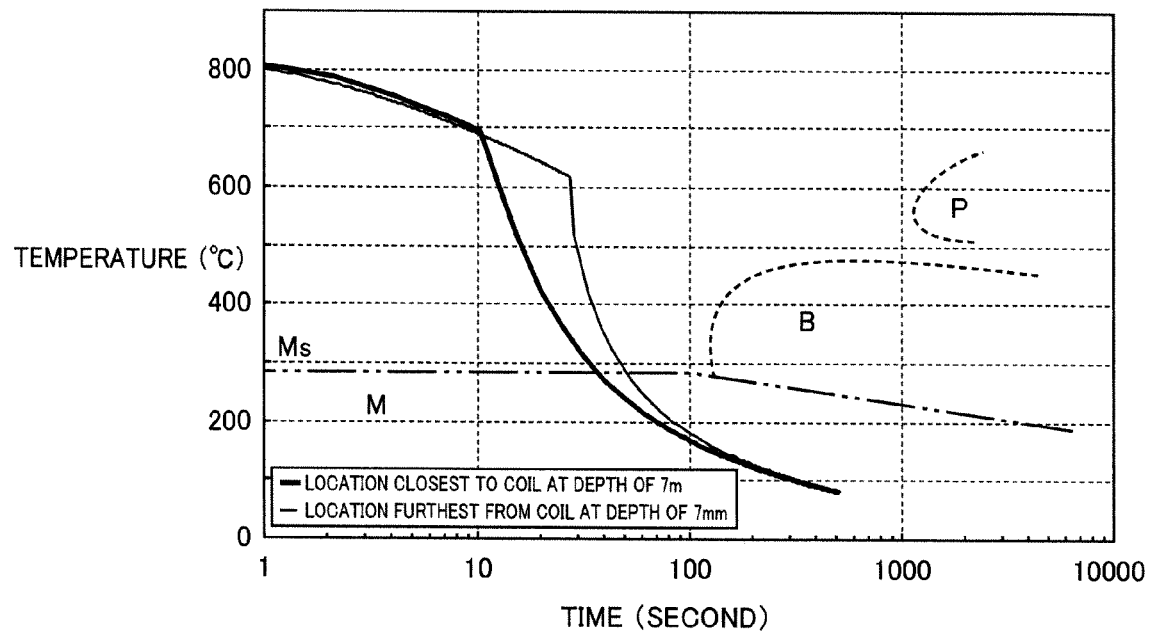
FIG. 7 shows a temperature history in a quenching step.

FIG. 7 shows a CCT (Continuous Cooling Transformation) diagram of SUP13, which is accompanied with temperature histories in formed body 10 during a period of time from the end of the steps (S21) and (S22) to the completion of the step (S30). FIG. 7 shows temperature histories in the region at a depth of 7 mm from rolling contact surface 11A thick line represents a temperature history in a region having been closest to coil 21 at the end of the steps (S21) and (S22). A thin line represents a temperature history in a region having been furthest away therefrom (region for which the longest time has elapsed since the last time this region was heated by coil 21) at the end of the steps (S21) and (S22).

As shown in FIG. 7, not only the region having been closest to coil 21 but also the region having been furthest therefrom are cooled to a temperature of not more than the temperature of the $M_s$ point without meeting a perlite nose (indicated by "P" in the figure) and a bainite nose (indicated by "B" in the figure). By performing the step (S30) in this way, a good quench-hardened layer is formed.

It should be noted that a various types of steels can be employed for the steel or the formed body, but it is preferable to employ a steel having quenchability suitable for the process in the aforementioned embodiment, such as: a steel containing not less than 0.43 mass % and not more than 0.65 mass % of carbon, not less than 0.15 mass %, and not more than 0.35 mass % of silicon, not less than 0.60 mass % and not more than 1.10 mass % of manganese, not less than 0.30 mass % and not more than 1.20 mass % of chromium and not less than 0.15 mass % and not more than 0.75 mass % of molybdenum with the rest consisting of iron and an impurity; or a steel containing not less than 0.35 mass % and not more than 0.75 mass % of nickel in addition to these. Specific examples thereof include JIS SUP13, SCM 445, SAE standard 8660H and the like.

Preferably, in the steps (S21) and (S22), each region of rolling contact surface 11 is retained, for an accumulated time of not less than 1 minute, in the state in which each region of rolling contact surface 11 has a temperature exceeding the temperature of the $A_1$ point, and then the step (S30) is performed. In this way, the quenching treatment can be per more securely with the carbon of the steel being appropriately dissolved in the base material.

(Second Embodiment)

The following describes another embodiment of the present invention, i.e., a second embodiment. A method for producing an inner ring as a ring-shaped member according to the second embodiment is basically performed similarly to the case of the first embodiment, and attains similar effects. However, the method for producing the inner ring according to the second embodiment is different from the case of the first embodiment in arrangement of coils 21 in the step (S20).

Figure 8:
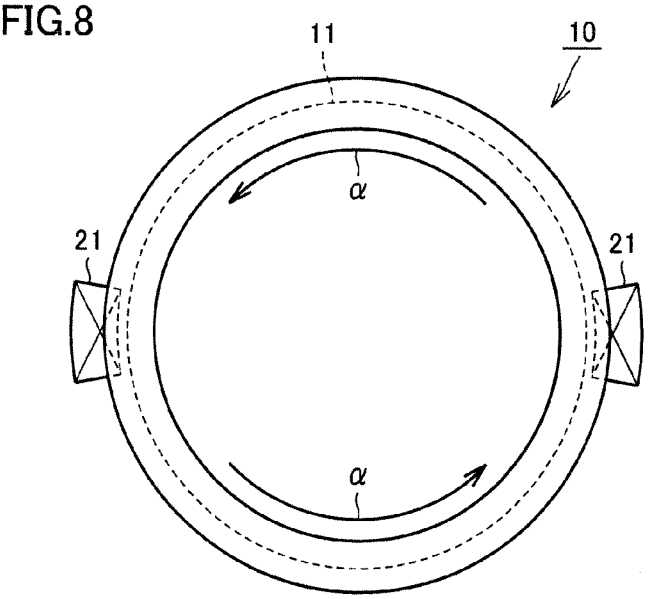
FIG. 8 is a schematic diagram for illustrating a quench hardening step in a second embodiment.

In other words, referring to FIG. 8, a pair of coils 21 are arranged with a formed body 10 therebetween in the step (S20) in the second embodiment. Then, formed body 10 is rotated. in a direction of arrow α, while a high-frequency current is supplied to coils 21 from a power source (not shown).

Because the plurality of On the present embodiment two) coils 21 are thus arranged in the circumferential direction of formed body 10, the supercooled austenite state can be maintained readily in the step (S22) of the method for producing the inner ring of the rolling bearing according to the second embodiment.

While the case of fixing coils 21 and rotating formed body 10 has been described in the aforementioned embodiment, coils 21 may be rotated in the circumferential direction of formed body 10 while fixing formed body 10, or coils 21 may be relatively rotated along the circumferential direction of formed body 10 by rotating both of coils 21 and thrilled body 10. However, wires or the like supplying the current to coils 21 are necessary for coils 21, and hence it is usually rational to fix coils 21 as described above.

While a case where heat treatment and production of an inner ring of a radial rolling bearing as an example of a ring-shaped member are executed has been described in the aforementioned embodiment, a ring-shaped member to which the present invention is applicable is not restricted to this, but may be an outer ring of a radial roller bearing or a hearing ring of a thrust bearing, for example. Further, the ring-shaped member to which the present invention is applicable is not restricted to the bearing ring of the bearing, but the present invention can be applied to heat treatment and production of various ring-shaped members made of steel. In a case of heating an outer ring of a radial roller bearing, for example, in the steps (S20) to (S22), coils 21 may be arranged to face a rolling contact surface formed on an inner peripheral side of a formed body. In a case of heating a bearing ring of a thrust rolling bearing, for example, in the steps (S20) to (S22), coils 21 may be arranged to face a rolling contact surface formed on an end surface side of a formed body.

While a case where partial quenching of quench-hardening only the surface layer portion of the bearing ring, of the rolling bearing including the rolling contact surface is executed by utilizing the characteristic of high-frequency quenching capable of partially quench-hardening a treated object has been described in the aforementioned embodiment, the present invention is not only applicable to the partial quenching, but also applicable to a case of quench-hardening the whole of a bearing ring for example.

While the length of a coil 21 in the circumferential direction of formed body 10 can be appropriately determined so as to implement appropriate heating, the length can he set to approximately not less than ¼ and not more than ¹⁄₁₅ of the length of the region to be heated, for example, in the case where a plurality of coils 21 are used, the total value of the lengths of coils 21 should fall within the above range.

(Third Embodiment)

The following describes a third embodiment in which ring-shaped members are employed as bearing rings of bearings for a wind turbine generator (rolling bearings tor a wind turbine generator).

Figure 9:
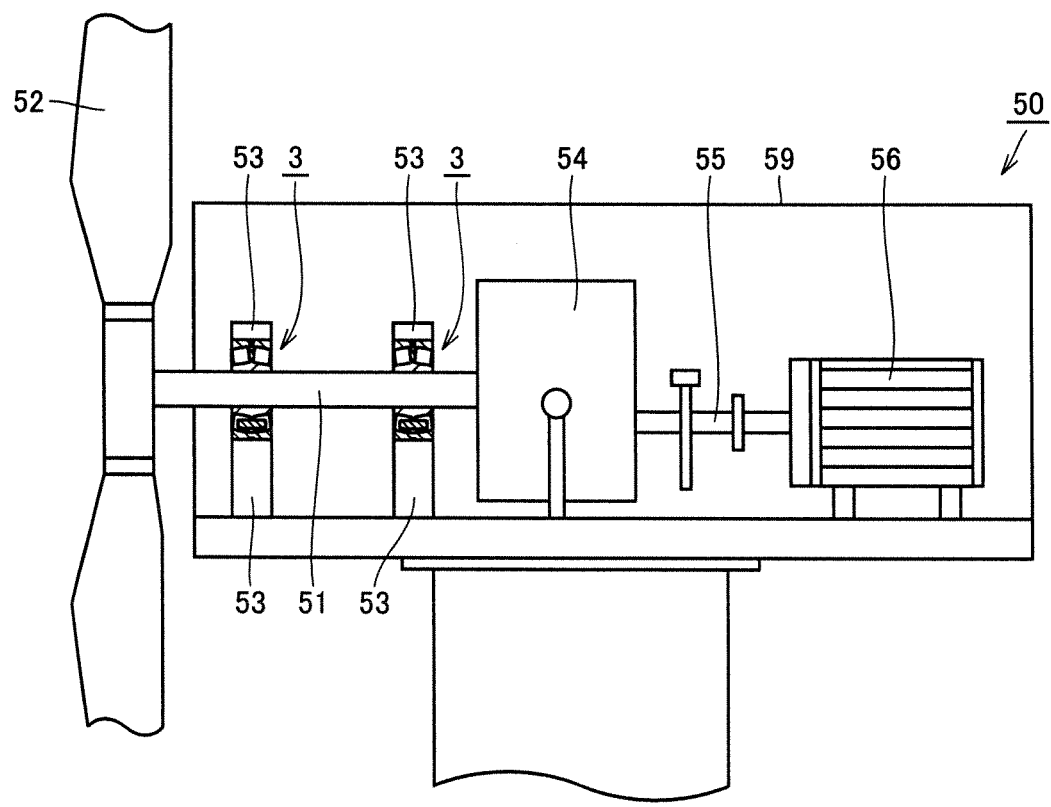
FIG. 9 is a schematic diagram showing a configuration of a wind turbine generator including a rolling bearing for a wind turbine generator.

Referring to FIG. 9, a wind turbine generator 50 includes a blade 52 which is a swirler, a main shaft 51 connected to blade 52 on one end to include the central axis of blade 52, and a speed increaser 54 connected to another end of main shaft 51. Further, speed increaser 54 includes an output shaft 55, and output shaft 55 is connected to a generator 56 Main shaft 51 is supported by main shaft bearings 3 which are rolling bearings for a wind turbine generator, to be rotatable on an axis. The plurality of (in FIG. 9 two) main shaft bearings 3 are arranged side by side in the axial direction of main shaft 51, and held by housings 53. Main shaft bearings 3, housings 53, speed increaser 54 and generator 56 are stored in a nacelle 59 which is a machinery room Main shaft 51 protrudes from nacelle 59 on one end, and is connected to blade 52.

Operation of wind turbine generator 50 is now described. Referring to FIG. 9, when blade 52 rotates in the circumferential direction by receiving wind power, main shaft 51 connected to blade 52 rotates on the axis while being supported by main shaft bearings 3 with respect to housings 53. The rotation of main shaft 51 is transmitted to speed increaser 54 to be speeded up, and converted to rotation of output shaft 55 on an axis. The rotation of output shaft 55 is transmitted to generator 56, and electromotive three is so generated by electromagnetic induction that power generation is achieved.

Figure 10:
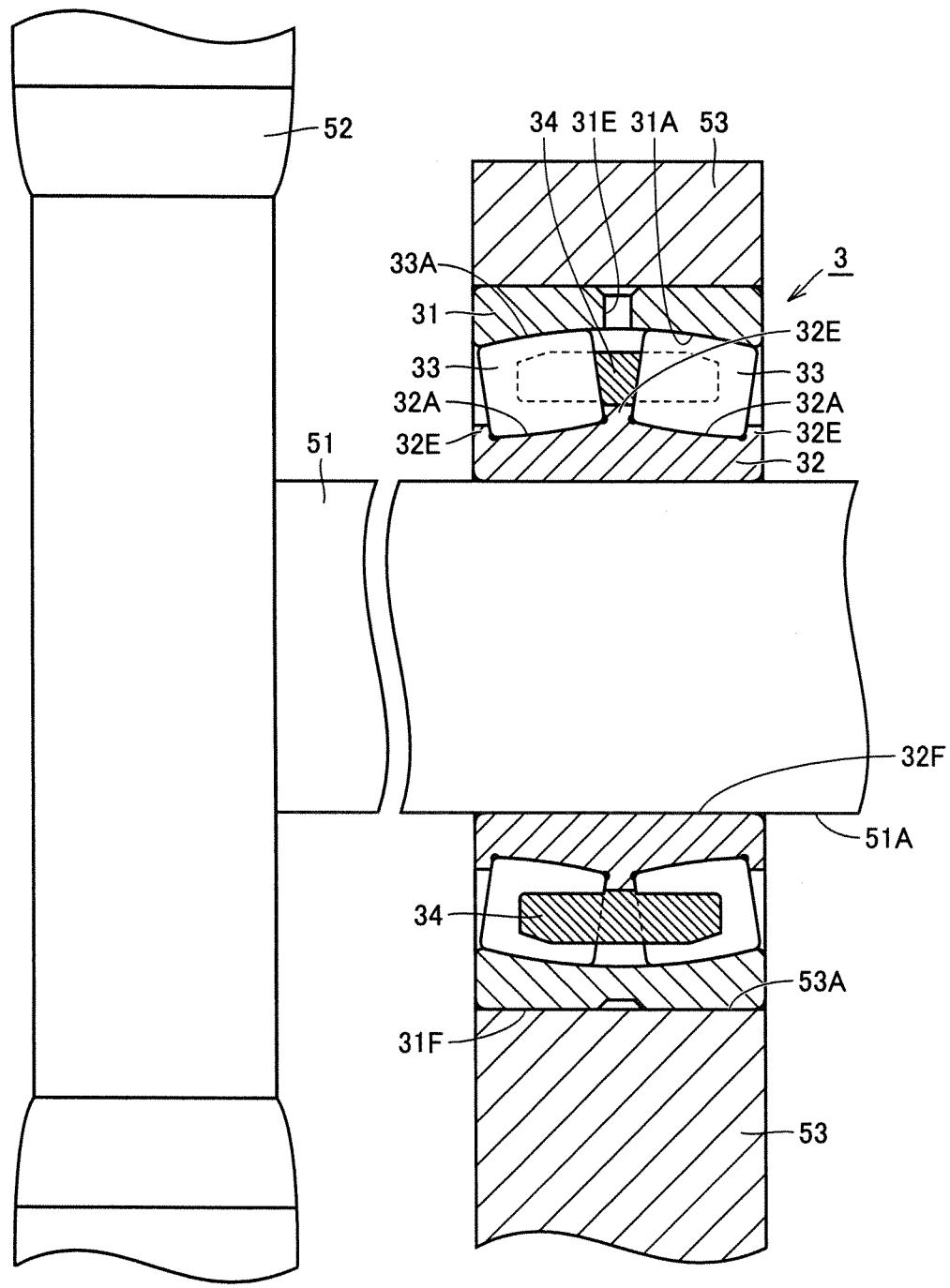
FIG. 10 is a schematic sectional view showing the periphery of a main shaft bearing in FIG. 9 in an enlarged manner.

A support structure for main shaft 51 of wind turbine generator 50 is now described Referring to FIG. 10, each main shaft bearing 3 as a rolling bearing for a wind turbine generator includes an annular outer ring 31 as a bearing ring of the rolling bearing for a wind turbine generator, an annular inner ring 32 as a bearing ring or the rolling bearing for a wind turbine generator arranged on the inner peripheral side of outer ring 31, and a plurality of rollers 33 arranged between outer ring 31 and inner ring 32 and held by an annular cage 34. An outer ring rolling contact surface 31A is formed on the inner peripheral surface of outer ring 31, and two inner ring rolling contact surfaces 32A are formed on the outer peripheral surface of inner ring 32. Outer ring 31 and inner ring 32 are so arranged that two inner ring rolling contact surfaces 32A are opposed to outer ring rolling contact surface 31A. Further, the plurality of rollers 33 are in contact with outer ring rolling contact surface 31A and inner ring rolling contact surfaces 32A on roller contact surfaces 33A along the respective ones of two inner ring rolling contact surfaces 32A, and held by cage 34 and arranged at a prescribed pitch in the circumferential direction, to be rollably held on double rows (two rows) of annular raceways. A through-hole 31E passing through outer ring 31 in the radial direction is formed in outer ring 31. A lubricant can be supplied to a space between outer ring 31 and inner ring 32 through this through-hole 31E.

Outer ring 31 and inner ring 32 of main shaft bearing 3 are mutually relatively rotatable, due to the aforementioned structure.

On the other hand, main shaft 51 connected to blade 52 passes through inner ring 32 of main shaft bearing 3, is in contact with an inner peripheral surface 32F of the inner ring on an outer peripheral surface 51A, and fixed to inner ring 32. Outer ring 31 of main shall bearing 3 is fitted to come into contact with an inner wall 53A of a through-hole formed in housing 53 on an outer peripheral surface 31F, and fixed to housing 53. Main shaft 51 connected to blade 52 is rotatable on the axis with respect to outer ring 31 and housing 53 integrally with inner ring 32, due to the aforementioned structure.

Further, flange portions 32E protruding toward outer ring 31 are formed on both ends of inner ring rolling contact surfaces 32A in the width direction. Thus, a load in the axial direction of main shaft 51 caused by blade 52 receiving wind is supported. Outer ring rolling contact surface 31A has a spherical surface shape. Therefore, outer ring 31 and inner ring 32 can mutually form an angle while centering on the center of this spherical surface on a cross section perpendicular to the rolling direction of rollers 33. In other words, main shaft bearing 3 is a double-row self-aligning roller bearing. Consequently, even in a case where main shaft 51 is deflected due to blade 52 receiving wind, housing 53 can stably rotatably hold main shaft 51 through main shaft bearing 3.

Outer ring 31 and inner ring 32 as bearing rings of a rolling bearing for a wind turbine generator according to the third embodiment are produced by the method for producing the ring-shaped member according to the aforementioned first or second embodiment, for example. Outer ring 31 and inner ring 32 are bearing rings of a rolling bearing for a wind turbine generator having inner diameters of not less than 1000 mm. Thus, the production cost for outer ring 31 and inner ring 32 can be reduced by producing them using the production method allowing for suppression of production cost for a quenching apparatus. Further, the whole of heated region 11A is simultaneously cooled to the temperature of not more than the $M_s$ point and is quench-hardened in the first and second embodiments described above, so that a quench-hardened layer including the rolling contact surface (outer ring rolling contact surface 31A and inner ring rolling contact surface 32A) can be formed at a uniform depth along the entire circumference, thereby obtaining outer ring 31 and inner ring 32 both excellent in durability.

The embodiments disclosed herein are illustrative and non-restrictive in any respect The scope of the present invention is defined by the terms of the claims, rather than the embodiments described above, and is intended to include any modifications within the scope and meaning equivalent to the terms of the claims.

Industrial Applicability

The method for heat-treating the ring-shaped member and the method for producing the ring-shaped member in the present invention can be applied particularly advantageously to a method for heat-treating a ring-shaped member and a method for producing a ring-shaped member, each of which is required to suppress production cost for a quenching apparatus.

Reference Signs List

3: main shaft bearing; 10: formed body; 11: rolling contact surface; 11A: heated region; 21: coil; 31: outer ring; 31A: outer ring rolling contact surface; 31E: through-hole; 31F: outer peripheral surface; 32: inner ring; 32A: inner ring rolling contact surface; 32E: flange portion; 32F: inner peripheral surface; 33: roller; 33A: roller contact surface; 34: cage; 50: wind turbine generator; 51: main shaft; 51A: outer peripheral surface; 52: blade; 53: housing; 53A: inner wall; 54: speed increaser; 55: output shaft; 56: generator; 59: nacelle.

The invention claimed is:

1. A method for heat-treating a ring-shaped member comprising the steps of:
    forming, by relatively rotating an induction heating member arranged to face part of a circumferential surface of a ring-shaped member made of steel for induction-heating said ring-shaped member along the circumferential direction of said ring-shaped member, an annular heated region in said ring-shaped member, said heated region having said steel austenitized therein; and
    simultaneously cooling a whole of said heated region to a temperature of not more than an $M_s$ point,
    in the step of forming said heated region, the heating being performed to repeatedly change over for a plurality of times between a state in which each region of said circumferential surface has a temperature exceeding a temperature of an $A_1$ point and a state in which each region of said circumferential surface has a temperature that is less than the temperature of the $A_1$ point and that maintains a supercooled austenite state.

2. The method for heat-treating the ring-shaped member according to claim 1, wherein a plurality of said induction heating members are arranged along the circumferential direction of said ring-shaped member in the step of forming said heated region.

3. The method for heat-treating the ring-shaped member according to claim 1, wherein the steel of said ring-shaped member contains not less than 0.43 mass % and not more than 0.65 mass % of carbon, not less than 0.15 mass % and not more than 0.35 mass % of silicon, not less than 0.60 mass % and not more than 1.10 mass % of manganese, not less than 0.30 mass % and not more than 1.20 mass % of chromium and not less than 0.15 mass % and not more than 0.75 mass % of molybdenum with the rest consisting of iron and an impurity.

4. The method for heat-treating the ring-shaped member according to claim 1, wherein the steel of said ring-shaped member contains not less than 0.43 mass % and not more than 0.65 mass % of carbon, not less than 0.15 mass % and not more than 0.35 mass % of silicon, not less than 0.60 mass % and not more than 1.10 mass % of manganese, not less than 0.30 mass % and not more than 1.20 mass % of chromium, not less than 0.15 mass % and not more than 0.75 mass % of molybdenum and not less than 0.35 mass % and not more than 0.75 mass % of nickel with the rest consisting of iron and an impurity.

5. The method for heat-treating the ring-shaped member according to claim 1, wherein in the step of forming said heated region, each region of said circumferential surface is retained, for an accumulated time of not less than 1 minute, in the state in which each region of said circumferential surface has the temperature exceeding the temperature of the $A_1$ point, and then the step of cooling the whole of said heated region is performed.

6. The method for heat-treating the ring-shaped member according to claim 1, wherein in the step of forming said heated region, said heated region is formed such that said circumferential surface does not have a temperature exceeding 1000° C.

7. The method for heat-treating the ring-shaped member according to claim 1, wherein said ring-shaped member has an inner diameter of not less than 1000 mm.

8. A method for producing a ring-shaped member, comprising the steps of:
   preparing a ring-shaped formed body made of steel; and
   quench-hardening said formed body,
   said formed body being quench-hardened with the method for heat-treating the ring-shaped member as recited in claim 1 in the step of quench-hardening said formed body.

9. The method for producing the ring-shaped member according to claim 8, wherein said ring-shaped member is a bearing ring of a bearing.

10. The method for producing the ring-shaped member according to claim 9, wherein said bearing ring is used for a rolling bearing that supports a main shaft connected to a blade in a wind turbine generator.

* * * * *